Figure 6:
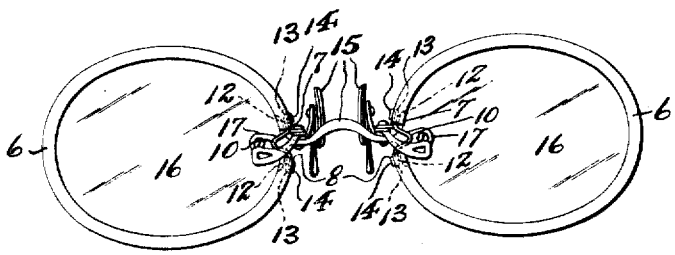

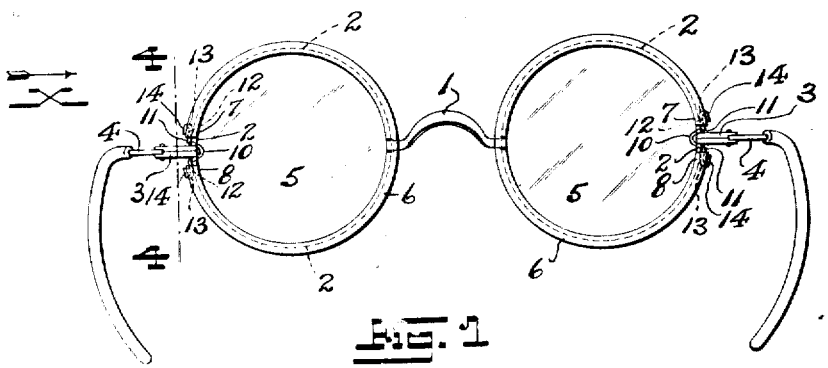
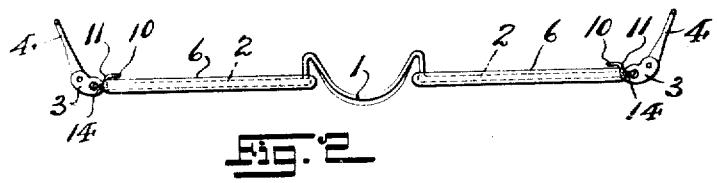
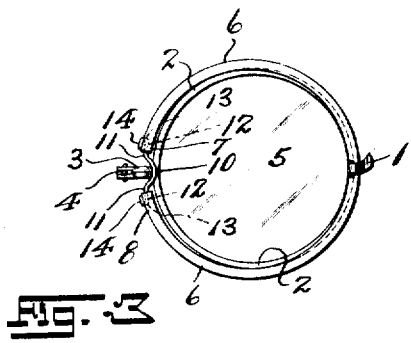
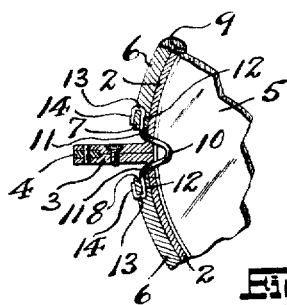
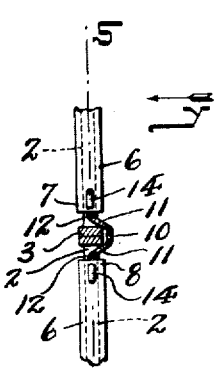

G. J. LOWRES.
SLIP-ON REMOVABLE LENS RIM FOR SPECTACLES, &c.
APPLICATION FILED DEC. 5, 1917.

1,269,624.

Patented June 18, 1918.
2 SHEETS—SHEET 2.

WITNESSES:
Fredk W Frantzel
Eva E Oesch

INVENTOR
George J. Lowres,
BY
Frantzel & Richards,
ATTORNEYS

UNITED STATES PATENT OFFICE.

GEORGE J. LOWRES, OF NEWARK, NEW JERSEY.

SLIP-ON REMOVABLE LENS-RIM FOR SPECTACLES, &c.

1,269,624.

Specification of Letters Patent. Patented June 18, 1918.

Application filed December 5, 1917. Serial No. 205,613.

*To all whom it may concern:*

Be it known that I, GEORGE J. LOWRES, a citizen of the United States, residing at Newark, in the county of Essex and State of New Jersey, have invented certain new and useful Improvements in Slip-On Removable Lens-Rims for Spectacles, &c.; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in spectacles, eyeglasses, and the like; and the invention has reference, more particularly, to a novel construction of "slip-on" removable lens rim for spectacles, eyeglasses, etc.

The present invention has for its principal object to provide a simple, efficient and novel construction of removable "slip-on" rim for the lenses of spectacles, eyeglasses, etc., which may be made of either non-metallic or metallic material, and which may be used in connection with lenses already mounted in permanent metallic rim frames or mountings, or in connection with lenses mounted in rimless frames or mountings, to provide the same with a desired rim appearance, or convert the mountings of the same from the rimless to the rim style of appearance without in any way altering or interfering with the permanent mounting or frame.

Other objects of the present invention, not at this time more particularly enumerated, will be clearly understood from the following detailed description of the same.

With the various objects of my present invention in view, the same consists, primarily, in the novel construction of detachable "slip-on" rim member for spectacles, eyeglasses, etc., hereinafter set forth; and, the invention consists, furthermore, in the various novel arrangements and combinations of the several devices and parts, as well as in the details of the construction of the same, all of which will be more fully described in the following specification, and then finally embodied in the appended claims.

The invention is clearly illustrated in the accompanying drawings, in which:—

Figure 1 is a front elevation of a pair of rim-frame spectacles provided with my novel construction of detachable "slip-on" rim members; Fig. 2 is a plan view of the same; and Fig. 3 is a rear face view of one lens portion of the same, illustrating the manner of applying and securing my novel "slip-on" rim member thereto. Fig. 4 is a detail cross section, drawn on an enlarged scale, and taken on line 4—4 in said Fig. 1, looking in the direction of the arrow *x*. Fig. 5 is a detail transverse longitudinal section, taken on line 5—5 in said Fig. 4, looking in the direction of the arrow *y*.

Figure 7:
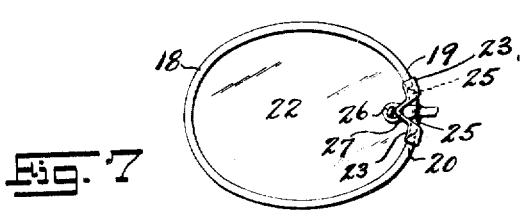
Figure 8:
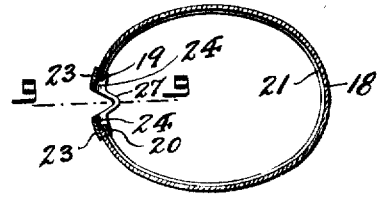
Figure 9:
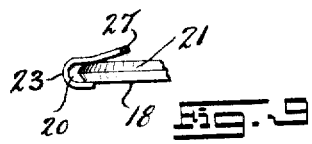

Fig. 6 is a front elevation of a pair of eyeglasses mounted in a rimless mounting provided with my novel construction of detachable "slip-on" rim members. Fig. 7 is a front elevation of one of the lenses of a pair of eye-glasses mounted in a rimless mounting, provided with a slightly modified construction of my novel detachable "slip-on" rim member made in metallic form; Fig. 8 is a longitudinal section through said metallic "slip-on" rim member; and Fig. 9 is a detail horizontal section therethrough, taken on line 9—9 in said Fig. 8 looking downward, said view being drawn on an enlarged scale.

Figure 10:
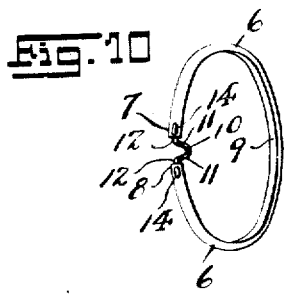

Fig. 10 is a perspective view of my novel "slip-on" rim member, made in non-metallic form, and detached from connection with the spectacles, or eyeglasses.

Similar characters of reference are employed in all of the hereinabove described views to indicate corresponding parts.

Referring now to the said drawings, the reference character 1 indicates the bridge-piece of a spectacle frame, 2 the metallic rims permanently secured thereto, 3 the end-pieces of said rims 2, to which are attached, in pivotal connection, the temples 4, and 5 indicates the lenses inclosed in said rims 2.

In many cases the users of spectacles and eyeglasses desire the same to have the appearance of horn-rimmed styles, and consequently many styles of frames and mountings providing lens rims of horn, tortoise-shell, celluloid and other non-metallic material are in use. It is the object of my present invention, principally, to provide a detachable "slip-on" rim which may be applied to and over either the ordinary metallic rimmed frame or mounting, or to the lenses of the rimless frames or mountings, to quickly and easily convert such spectacles or eyeglasses to the desired color and material of horn-rimmed appearance, or, in other cases, to provide said rimless frames or mounting with a metallic rim appearance. To this end my novel construction of detachable "slip-on" rim member, as shown more particularly in Figs. 1 to 5 inclusive and Fig. 10 of the drawings, comprises a non-metallic rim portion 6, which may be made of any suitable material, such as horn, tortoise-shell, celluloid, rubber, or the like. Said rim portion 6 is transversely split at one side to provide separable ends 7 and 8. Said rim portion 6 is further provided with an inner annular channel or groove 9 adapted to receive and embrace the metallic rims 2 of the spectacle frame. The separable ends 7 and 8 of said split rim portion 6 are secured together by means of a peculiar and novel clamp coupling device which comprises a laterally off-set inwardly extending U-shaped loop-member 10 made of wire, or some similarly suitable material. The arms of said loop-member 10 are provided with off-set portions 11, from which extend in substantially vertical relation, anchor-arms 12. The said anchor-arms 12 are respectively inserted endwise into the respective separable ends 7 and 8 of said rim member 6, and are secured in fixed relation thereto against withdrawal therefrom, by some suitable means, preferably comprising an outwardly turned portion 13 which extends laterally through the rim member 6 so as to project from the outer surface thereof, the outwardly projecting ends of said portions 13 being clenched over against the surface of said rim member 6, and thus providing clenching lugs 14 which firmly and fixedly secure said anchor-arms 11 and the lateral portions 13 thereof against detachment from the respective ends 7 and 8 of said rim member 6. By opening up the U-shaped loop-member 10 so that its arms are separated, as indicated in Fig. 3 of the drawings, the separable ends 7 and 8 of the rim member 6 are opened to expand or enlarge the circumference of the rim member 6. When thus expanded the rim-member 6 is inserted over the temple 4 and arranged upon the metallic rim 2 of the spectacle frame, so that said metallic rim 2 is received within the annular groove or channel 9, thus inclosing said metallic rim 2 within the rim member 6. When thus positioned the loop-member 10, being laterally off-set by the off-set portions 11 thereof, straddles the end pieces 3 of the metallic rims 2, and clearing the same extends inwardly in the plane of the lenses 5, and in the rear of the latter. When the "slip-on" rim member 6 is thus associated with the rims 2 and their lenses 5, the arms of the loop member 10 are pinched together, thus drawing together the separable ends 7 and 8 of the rim member 6, and causing the latter to snugly and securely embrace the rim 2, which it conceals, thus, at the same time, firmly and securely clamping said rim member 6 in operative attached position. The loop-member 10, may if desired be made of springy material, the tension of which is so exerted as to draw its arms normally together, or it may be made of material of such character that it is easily bendable by tools or the fingers, while retaining the conformation, either opened or contracted, to which it is bent. It will be apparent from the above description, that my novel construction of "slip-on" rim member may be easily and quickly attached and detached from the spectacle frame, without need of any positive connection with said frame, and without need of altering or in any way injuring or affecting the said spectacle frame. By means of such novel rim member either old or new spectacles, regardless of the kind of metallic frame or mounting they possess, may be quickly and efficiently converted into the so-called horn-rimmed style of spectacles.

Referring now to Fig. 6 of the drawings, I have shown therein a pair of eyeglasses possessing a rimless mounting 15 interconnecting the lenses 16 thereof, and have further shown therein my novel construction of "slip-on" detachable rim member applied thereto, the construction of the latter being the same as above described, except for its oval shape, and therefore identified as to its parts by the same reference characters. It will be noticed that the off-set loop-portion 10 thereof straddles the strap-member 17 of the mounting 15.

Referring now to Figs. 7, 8 and 9 of the accompanying drawings, I have therein illustrated a slightly modified construction of my novel "slip-on" detachable rim member. In this construction I provide a metallic rim portion 18, split at one side to provide separable ends 19 and 20, and provided with an inner annular groove or channel 21 to receive and embrace the periphery of a lens 22. The coupling clamp by means of which the ends 19 and 20 are connected together comprises a pair of U-shaped socket-pieces 23, adapted to embrace said ends 19 and 20, the latter being soldered or otherwise affixed thereto. The unoccupied portions 24 of said socket-pieces 23 provide seats for the ends of the lens-seat portions 25 of the lens straps 26. Connected integrally with said socket-pieces 23 at their inner ends, and so as to extend from one side thereof, is an interconnecting loop-portion 27, which, when the rim is engaged over the lens extends laterally over the straps 26 of the mounting. By contracting or pinching together the loop-portion 27, the ends 19 and 20 are drawn together, and the rim member 18 thereby is caused to snugly and securely embrace the periphery of the lens in substantially the same manner, as already above described. This metallic "slip-on" rim member is adapted for use more particularly with rimless eyeglass mountings and spectacle frames, to convert the same to the appearance of a rimmed mounting or frame.

I am aware that some changes may be made in the general arrangements and combinations of the devices and parts, as well as in the details of the construction of the same, without departing from the scope of my present invention as defined in the appended claims. Hence, I do not limit my invention to the exact arrangements and combinations of the various devices and parts as set forth in the foregoing specification, nor do I confine myself to the exact details of the construction of said parts as illustrated in the accompanying drawings.

I claim:—

1. A detachable rim for spectacles, eyeglasses and the like, comprising a rim member split at one side to provide separable ends, and a clamp coupling joining said ends comprising an expandible and contractable loop-member the arms of which are respectively secured in fixed relation to said respective ends of said rim member.

2. A detachable rim for spectacles, eyeglasses and the like, comprising a rim member split at one side to provide separable ends, and a clamp coupling joining said ends comprising an expandible and contractable loop-member the arms of which are respectively secured in fixed relation to said respective ends of said rim member, said arms of said loop-member being further provided with off-set portions adapted to laterally off-set the main body of said loop-member from the plane of said rim-member.

3. In a device of the kind described, a non-metallic rim-member having an inner annular groove, said rim-member being split at one side to provide separable ends, an expandible and contractable loop-member having normally diverging arms, means connected with the free ends of said arms for securing the same respectively to the separable ends of said rim-member, comprising anchor portions penetrating said separable ends end-wise, and said anchor portions terminating in laterally and outwardly projecting portions emerging from the outer surface of said rim-member, the free ends of said outwardly projecting portions being turned against the surface of said rim member to provide clenching lugs.

4. In a device of the kind described, a non-metallic rim-member having an inner annular groove, said rim-member being split at one side to provide separable ends, an expandible and contractable metallic loop-member having normally diverging arms, said normally diverging arms having off-set portions adapted to off-set said loop-member from the plane of said rim-member, and means connected with the free ends of said arms for securing the same respectively to the separable ends of said rim-member.

5. In a device of the kind described, a non-metallic rim-member having an inner annular groove, said rim-member being split at one side to provide separable ends, an expandible and contractable loop-member having normally diverging arms, said normally diverging arms having off-set portions adapted to offset said loop-member from the plane of said rim-member, means connected with the free ends of said arms for securing the same respectively to the separable ends of said rim-member, comprising anchor portions penetrating said separable ends end-wise, and said anchor portions terminating in laterally and outwardly projecting portions emerging from the outer surface of said rim-member, the free ends of said outwardly projecting portions being turned against the surface of said rim-member to provide clenching lugs.

6. The combination with spectacles, eyeglasses, or the like having the usual nose piece or bridge of a detachable slip-on split rim-member having no connection with the said nose piece or bridge and an expandible and contractable coupling clamp means interconnecting the ends of said rim-member.

In testimony that I claim the invention set forth above I have hereunto set my hand this 3rd day of December 1917.

GEORGE J. LOWRES.

Witnesses:
 FREDK. FRAENTZEL,
 FREDK. H. W. FRAENTZEL.